United States Patent [19]

Ashen et al.

[11] 3,749,191

[45] July 31, 1973

[54] APPARATUS AND METHOD TO FACILITATE SHOPPING

[76] Inventors: Ronald H. K. Ashen, Route 2, Box 611, Fredericksburg, Va. 22401
Richard L. Carpenter, 4709 Ramsgate Ln., Bowie, Md. 20715

[22] Filed: Mar. 23, 1972

[21] Appl. No.: 237,477

[52] U.S. Cl. .................... 177/1, 177/50, 235/61 A, 235/91 L
[51] Int. Cl. ..................... G01g 19/00, G01g 19/52
[58] Field of Search ............... 177/1, 50; 235/61 A, 235/91 L

[56] References Cited
UNITED STATES PATENTS
2,919,851   1/1960   Otis ................................. 235/91 L

*Primary Examiner*—George H. Miller, Jr.
*Attorney*—John N. Randolph

[57] ABSTRACT

A recorder for use by shoppers in a self-service store, having three sets of key banks for recording three groups of symbols, such as numerals, appearing on each item selected for purchase by the buyer. The recorder includes a mechanical verifier for determining the accuracy of the entries made in the recorder. The indicia appearing on each purchased item includes a coded number which, combined with the other two numbers of the indicia, must equal a predetermined total for the information to be recorded in the machine, and for restoring the keyboard to a condition ready to accept indicia appearing on the next purchased item. One of the other two numbers represents the price of the selected item while the other number represents the weight in ounces. When the indicia from all of the items selected for purchase are properly entered and totaled in the recorder, if the total weight of the selected items is correct, then the total price will be correct and may be paid by the customer without further checking or tallying of the purchases.

4 Claims, 6 Drawing Figures

PATENTED JUL 31 1973 3,749,191

APPARATUS AND METHOD TO FACILITATE SHOPPING

SUMMARY

The present invention relates to a novel apparatus and method capable of being utilized efficiently by shoppers in large supermarkets, for example, to record indicia appearing on each item selected for purchase so that when a shopper has completed his or her purchases, a cashier by comparing the actual weight of the purchases with the total of one group of numbers recorded on a machine can determine if the total price, as represented by another group of numbers, is correct. If so, the customer has merely to pay for his purchases without further delay and without further handling of the purchased items.

Another object of the invention is to provide such an apparatus by the use of which the customer is kept apprised of the total cost of the itmes already selected, enabling a shopper to purchase up to a total amount he or she has to spend and without fear of having overpurchased.

A further object of the invention is to provide an apparatus or method which in addition to functioning as a convenience and time saver to the shopper, will greatly reduce the operating expenses of the store by substantially reducing the space required for checkout counters as well as the number of cashiers required.

Still a further object of the invention is to provide an apparatus and method which will eliminate errors which can readily occur utilizing conventional checkout methods, to ensure both the purchaser and seller that the correct amount is being paid for the items purchased.

Various other objects and advantages of the invention will hereinafter become more fully apparent from the following description of the drawings, illustrating presently preferred embodiments thereof, and wherein:

DESCRIPTION OF THE PREFERRED EMBODIMENTS

Figure 5:
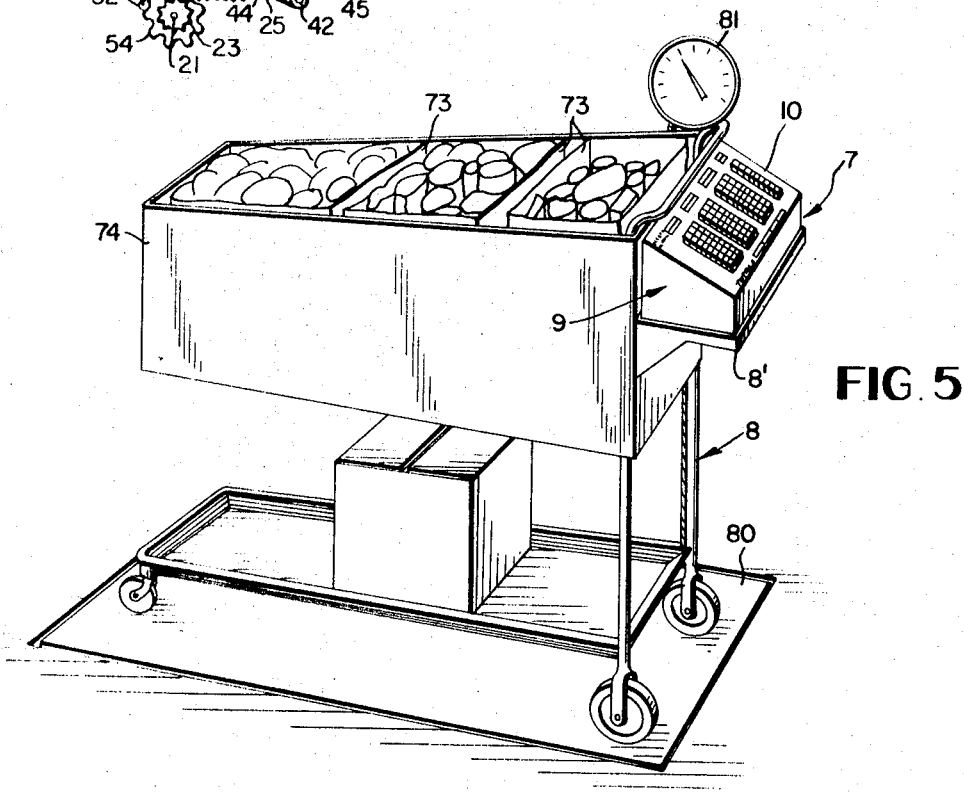
FIG. 5 is a perspective view of the entire invention showing a recorder of FIGS. 1 to 4, supported by a carrier for the purchased items, and with the carrier resting on a weighing scale.

Referring more specifically to the drawings, the recorder, designated generally 7, is shown in FIG. 5 supported on a conventional shopper's cart 8. The cart 8 may be provided with any suitable means, such as the shelf 8′, for detachably mounting the recorder 7.

Figure 3:
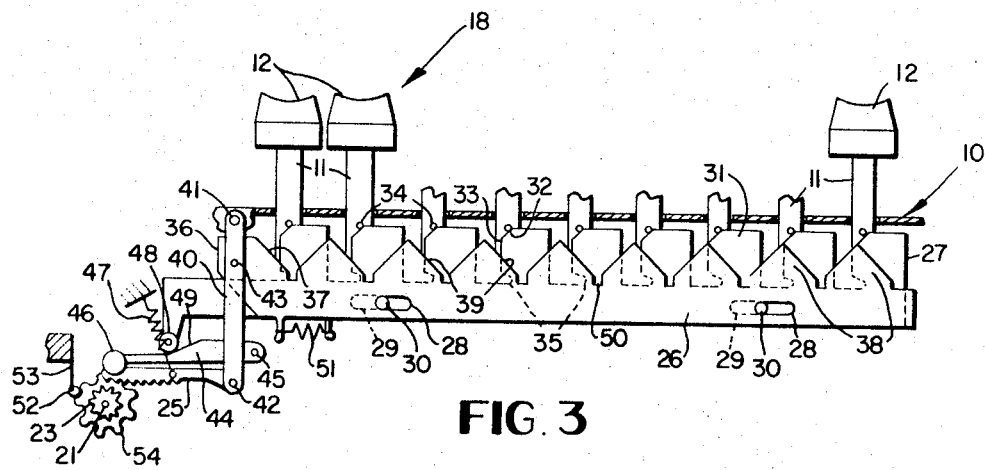
FIG. 3 is a fragmentary view partly in elevation and partly in section of one keybank in a non-actuated position.
Figure 4:
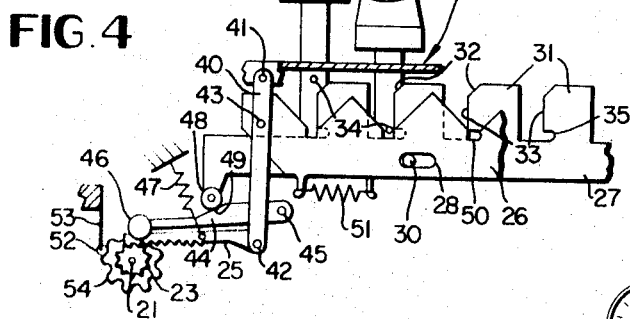
FIG. 4 is a view similar to a portion of FIG. 3 and showing one key in a partially actuated position.

Said recorder 7 includes a housing 9 having an included top wall 10 through which slidably extends a plurality of key stems 11 each of which supports a key 12 on its upper end, above and spaced from the wall 10, as seen in FIGS. 3 and 4. The keys 12 are arranged in three fields of key banks 13, 14 and 15 and a single key bank 16. Each of the fields 13, 14 and 15, as illustrated, includes three rows of keys or key banks designated 17, 18 and 19. Each key bank 17, 18 and 19 includes nine keys and the key bank 16 may also include nine keys. However, each field 13, 14 and 15 could include four or more key banks and an additional shaft 20 and its associated parts for each key bank added.

Journaled within the housing 9 are two shafts 20 and 21 each supporting three pinions 22 and 23, respectively. Rack bars 24 are positioned for engagement with the pinions 22 and rack bars 25 are arranged to engage the pinions 23.

FIG. 3 and 4 show a differential slide 26 and a key lock slide 27, and it will be understood that each key bank 17 and 18 includes a slide 26 and a slide 27. Said slides of each key bank have longitudinally extending slots 28 and 29, respectively, for slidably engaging stationary pins 30 which are supported by the housing 9 for supporting the slides for reciprocating movement.

The slide 27 has nine corresponding upwardly extending projections 31 each having an inclined surface 32 between a left hand edge 33 thereof and the upper end of said projection. Each key stem 11 has a laterally projecting pin 34, disposed below the top wall 10 and engaging the upper portion of the inclined cam surface 32 when the key stem 11 is in a full raised, non-actuated position, as seen in FIG. 3. Each projection 31 has a notch 35 which extends inwardly from the lower end of its edge 33. The differential slide 26 has a single upstanding projection 36 at its left hand end, having an inclined right hand edge 37. The slide 26 has eight additional projections 38 between the projection 36 and its opposite right hand end. Each projection 38 has an inclined right hand edge 39 corresponding to the edge 37. Spacing between the edge 37 and the adjacent edge 39 and between the remaining edges 39 differs relative to the spacing between the edges 33 and the spacing between the key stems 11, so that, as seen in FIG. 3, the edge 37 and all but the three right hand edges 39 intersect the edges 33, each at a point higher than the point of intersection of the edge 39 or 37 to the left thereof.

A lever 40 is pivoted at 41 at its upper end to the housing 9, and at its lower end is pivoted at 42 to the rack bar 25. The lever 40 is also pivoted to the projection 36 of the slide 26 at 43.

A hold-down lever 44 is pivotally mounted at one end at 45 for vertical swinging movement and has a roller 46 at its opposite end which rides on the upper edge of the rack bar 25. A pull spring 47 is connected to the rack bar 25 and normally maintains said bar in a raised position, as illustrated in FIG. 3, with its teeth above and out of mesh with the teeth of the pinions 23. A roller 48 which is mounted on a depending extension of the left end of the slide 27 rides on the upper edge of the lever 44 and is disposed forwardly of an inclined portion 49 thereof, when the parts are in their positions of FIG. 3.

FIG. 4 shows one of the buttons 12, after it has been depressed or actuated. The stud 34 of the stem of said button 12, during the initial downward movement thereof, rides down the cam surface 32, which it engages, for moving the slide 27 a predetermined distance from left to right. This movement causes the roller 48 to ride up the ramp surface 49 for swinging the lever 44 downwardly to rock the bar 25 downwardly about its pivot 42 to engage the teeth of said bar with the pinion 23. As the stud 34 moves down the edge 33 it contacts the edge 39, which intersects said edge 33, for moving the slide 26 from right to left, for swinging the lever 40 in the same direction, to advance the rack 25 for turning the pinion 23 and shaft 21 counterclockwise a part of a revolution the extent of which varies depending upon which key 12 of the key bank 18 has been depressed. For example, the left hand key causes turning of the shaft 21 a distance equal to one-half the amount of turning resulting from the depressing the key next thereto or one-ninth the amount resulting from depressing the right hand key 12. As the stud 34 reaches the lower end of the edge 33, it enters an upwardly opening notch 50 of the slide 26 and thereafter moves out of engagement with said edge 33 and into alignment with the notch 35, disposed beneath said edge 33. A pull spring 51, connecting the slides 26 and 27, pulls the slide 27 from right to left sufficiently to allow the roller 48 to ride down the ramp 49, to permit the spring 48 to raise the teeth of the rack 25 out of engagement with the pinion 23.

A roller 52, carried by a leaf spring 53, engages the teeth of a gear 54, which is fixed to the shaft 21, to releasably retain said shaft in any incremental position of rotation. The parts 52, 53 and 54 may be disposed in any convenient position along the length of the shaft 21, and a similar set of parts 52, 53 and 54 are provided for the shaft 20.

Figure 1:
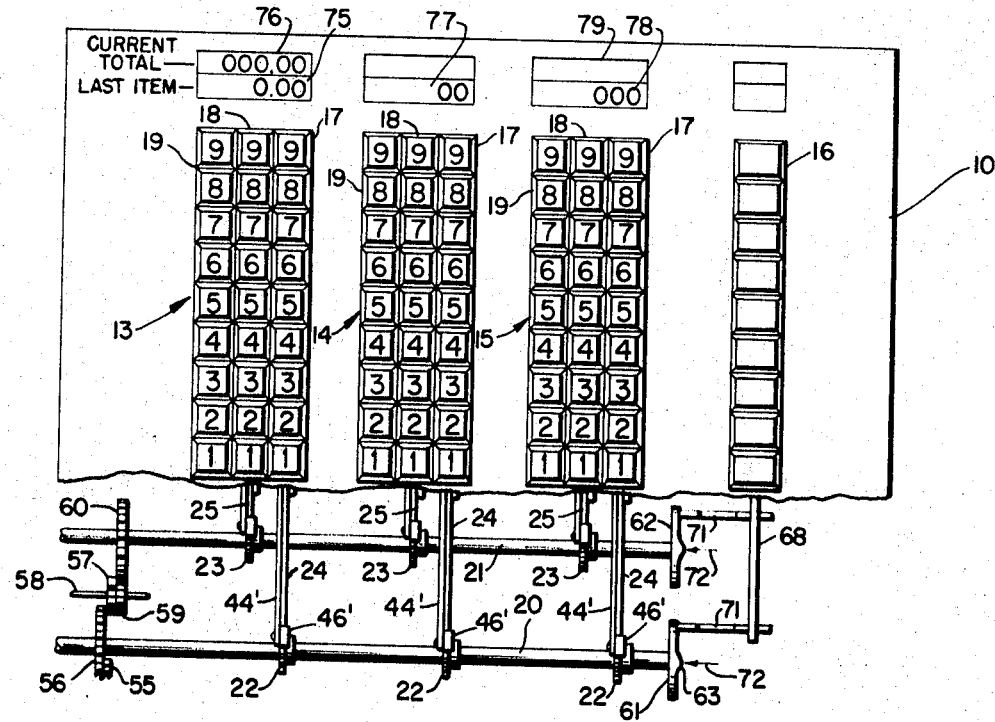
FIG. 1 is a schematic illustration of portions of the keyboard, check digit accumulator and interlock means of a recorder equipped with a verifying unit, capable of use as a part of the present invention.
Figure 2:
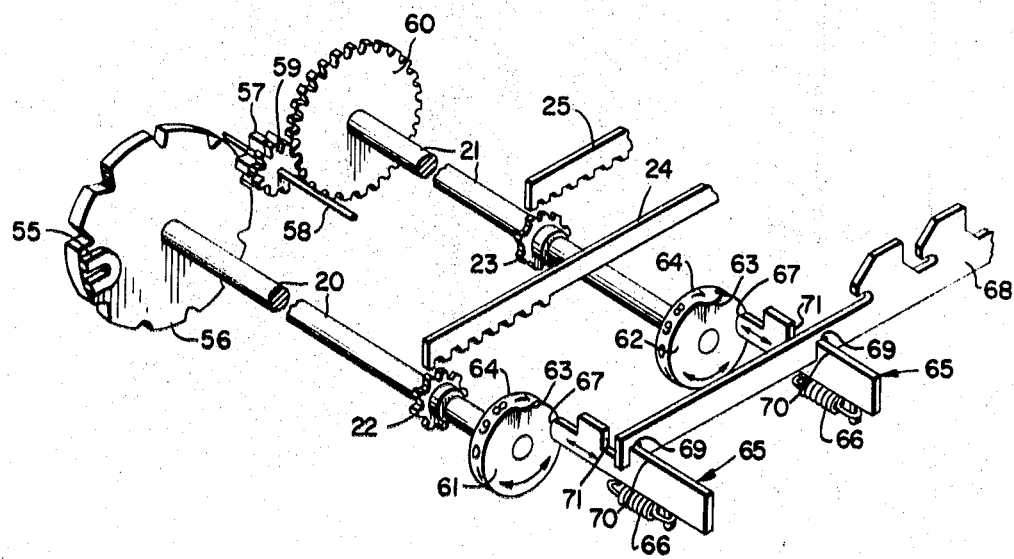
FIG. 2 is an enlarged perspective view of a portion of the accumulator and interlock means of FIG. 1.

The parts of the recorder 7, as illustrated in FIGS. 3 and 4, and certain of the parts shown in FIGS. 1 and 2, correspond with and function in the same manner as parts of the machine of U.S. Pat. No. 3,508,707 to Davis. However, the shaft 20, and its associated parts, of the recorder 7, does not constitute a part of the Davis patent and are essential for the functioning of applicant's recorder for its intended purpose. It is to be understood, however, that the recorder 7 is only intended to illustrate one recorder which could be utilized with applicant's apparatus and method and that other recorders capable of accomplishing the same result could be employed.

FIGS. 3 and 4, as previously stated, illustrate a key bank 18 or a tens key bank of either the key bank field 13, 14 or 15. Each unit key bank 17 includes all of the structure as shown in FIGS. 3 and 4, except that its rack bar 24 is longer than the rack bar 25 and the lever 44' thereof is longer than the lever 44, for positioning the roller 46' to engage the rack 24 adjacent its outer end.

Manipulation of the keys 12 of the key bank 17 accomplishes the same results as heretofore described except that the shaft 20, rather than the shaft 21, is turned counterclockwise. During each revolution of the shaft 20, a yoke 55, carried by a disc 56, fixed to said shaft 20, engages a tooth of a gear 57 and turns said gear and a shaft 58, to which the gear 57 is secured, a part of a revolution before said yoke disengages the gear. A pinion 59 is fixed to the shaft 58 and meshes with a gear 60 fixed to the shaft 21, for turning said gear 60 and shaft 21 an amount equal to one-tenth of a revolution. Thus, each time that the shaft 20 completes one revolution it turns the shaft 21 one-tenth of a revolution.

A disc 61 is fixed to the right hand end of the shaft 20 and a corresponding disc 62 is fixed to the same end of the shaft 21. Each disc has a hump or cam 63 on its outer side. The periphery of each disc is inscribed with numerals from zero to nine, as indicated at 64 in FIG. 2.

Two lockout bars 65 are slidably mounted in the housing 9 for reciprocating movement toward and away from the outer sides of the discs 61 and 62, which are provided with the cams 63. Pull springs 66, suitably anchored to the housing 9, urge the rounded noses 67 of the bars 65 into engagement with the outer faces of the discs. A lock slide 68 is disposed at a right angle to the bars 65 and has downwardly opening notches 69 which engage upper edge portions 70 of the bars 65. Each bar 65 has an upwardly opening recess 71, disposed to the left of the slide 68, when said bars 65 are in their positions of FIGS. 1 and 2, riding against the outer faces of the discs 61 and 62 and not in contact with the cams 63.

When three sets of correct numerals have been entered into the recorder 7, as heretofore described, to produce the selectd total, the shafts 20 and 21 will both have been turned sufficiently so that the cams 63 will have moved under the noses 67, for displacing the bars 65 from left to right sufficiently to position the slide 68 in engagement with the recesses 71, so that said slide is released for reciprocating movement, enabling any one of the keys of the key bank 16 to be depressed for recording the entries made into the recorder and for returning all of the keys to released positions, reversing the process of key depression and causing the numbers on cams 63 to sequentially return to their preset positions and prepared for the next insertion of indicia. With the discs 61 and 62, as seen in FIG. 2, the selected total is 77. Thus, if the price of an item is 29 cents and the weight thereof is 25 ounces, the code number must be 23 to produce the total of 77. The different keys of the key bank 16 may also be utilized for designating the type of purchase, such as "meat," "vegetables," etc..

A cover of the housing 10 can be opened by an authorized person for setting the cams 63 for different totals which must be entered into the machine in order that the slide 68 may be released to allow the totals to be recorded. Portions of the peripheries of the discs 61 and 62 are exposed and arrows 72 are provided to facilitate setting the shafts 20 and 21 when the housing cover is open.

The mechanism as illustrated in FIGS. 3 and 4 is reversible so that if an error is made, the erroneously depressed key is released by pressing the correct key which will result either in turning the shaft 20 or 21 a further amount counterclockwise, as seen in FIG. 2, to increase the value of the entry, or clcokwise to decrease the value. Registration of the entries by actuating a key of the key bank 16 is accomplished in a manner conventional in adding machines.

The key banks 19 are not provided with differential slides since only the last two digits are verified in the embodiment of the invention as herein illustrated, although three or more digits may be verified, if desired, by the use of additional shafts 21, yokes 56, pinions 60, etc., for each additional digit to be verified.

The cart 8, seen in FIG. 5, is of a conventional type except for the means 8' for supporting the recorder 7. The shopper in making his or her selections may place the selected items in bags 73 which have been previously placed in the cart receptacle 74, after entering the printed indicia appearing on each item in the recorder 7. The window 75 in the top wall 10 will enable the shopper to read the price of the last item recorded and the total cost of the already selected purchses can be read through the window 76. Through the window 77 the code number of the last item recorded can be read and through the window 78 the weight in ounces of said last item can be seen. The window 79 is covered so that the total weight of the selected items cannot be read. This window can be exposed by suitable means available only to the cashier when the customer is paying for his or her purchases and at which time the cart has been rolled onto the platform 80 of a conventional weighing scale having a conveniently located dial 81 where the weight in ounces of the purchases can be read, by deducting from the recorded weight, the weight of the cart 8 and recorder 7, or by having the scale set to compensate for this weight. If the actual weight of the purchases, as thus determined, corresponds with the weight appearing in the window 79, then the total price appearing in the window 76 is paid by the shopper who is then free to leave the store with his or her purchases already bagged and without removing the purchases from the bag at the checkout point. If the actual weight as read on the dial 81, after deducting for the weight of the cart and recorder, does not substantially correspond to the weight appearing through the window 79, the customer is required to check out his purchases in a conventional manner.

Figure 6:
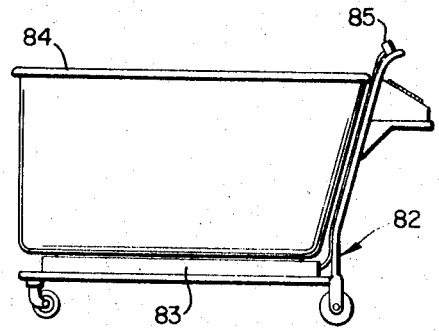
FIG. 6 is a side elevationa view illustrating a modification of the combination of FIG. 5.

FIG. 6 illustrates a slightly different embodiment of the invention and wherein the cart 82 has a weighing scale platform 83 supported on the cart chassis which in turn supports a receptacle or basket 84 in which the bagged purchases can be contained. The weight of said purchases can be read on a dial 85 of the weighing scale which is located adjacent the cart handle. The scale can be set to compensate for the weight of the basket 84 so that the reading on the dial 85 will correspond to the actual weight of the items purchased.

Various modifications and changes are contemplated and may be resorted to, without deparing from the function or scope of the invention.

We claim:

1. Means for expediting the movement of commodities comprising a weighing scale, a recorder having means for entering therein groups of symbols appearing on items selected for purchase, said recorder having means to prevent operation thereof except when the symbools of each group are entered correctly, means for comparing the total weight on the weighing scale with one group of symbols registered on the recorder, whereby if the total of the entry of one group of symbols representing weight corresponds with the correct total actual weight of the selected items, then the total of the entries of another group of said symbols constitutes the correct total cost of said items.

2. Means as defined by claim 1, and a cart for supporting and conveying the selected items and the recorder and by which the items are conveyed onto a platform of the scale for weighing.

3. Means as defined by claim 1, and a cart for supporting and conveying the recorder and the selected items, said weighing scale including a platform mounted on and supported by the cart chassis and a receptacle for supporting the selected items mounted on and supported by said platform.

4. A method of expedition the movement of commodities comprising selecting items to be purchased, entering groups of sybmols appearing on each item into a recorder, weighing the selected items to determine if the actual total weight thereof corresponds to the total of one group of symbols to determine if the total of another group of the symbols constitutes the correct total price of the selected items, and entering for each item a third check symbol to prevent operation of the recorder if the total of the symbols entered for any one item does not equal a pre-selected total symbol.

* * * * *